US010670310B2

(12) United States Patent
Lange et al.

(10) Patent No.: US 10,670,310 B2
(45) Date of Patent: Jun. 2, 2020

(54) MOTOR FOR USE IN REFRIGERANT ENVIRONMENT

(71) Applicant: REGAL BELOIT AMERICA, INC., Beloit, WI (US)

(72) Inventors: Martin Thomas Lange, Troy, OH (US); Bruce William Kielgas, Shanghai (CN)

(73) Assignee: Regal Beloit America, Inc., Beloit, WI (US)

( * ) Notice: Subject to any disclaimer, the term of this patent is extended or adjusted under 35 U.S.C. 154(b) by 338 days.

(21) Appl. No.: 15/049,937

(22) Filed: Feb. 22, 2016

(65) Prior Publication Data
US 2017/0241680 A1 Aug. 24, 2017
US 2019/0003753 A9 Jan. 3, 2019

Related U.S. Application Data

(63) Continuation-in-part of application No. 14/166,424, filed on Jan. 28, 2014, now abandoned.
(Continued)

(51) Int. Cl.
*H02K 15/02* (2006.01)
*F25B 31/02* (2006.01)
(Continued)

(52) U.S. Cl.
CPC ............ *F25B 31/026* (2013.01); *H02K 3/28* (2013.01); *H02K 3/30* (2013.01); *H02K 3/44* (2013.01);
(Continued)

(58) Field of Classification Search
CPC .. H02K 3/00; H02K 3/28; H02K 3/44; H02K 5/00; H02K 5/10; H02K 5/12;
(Continued)

(56) References Cited

U.S. PATENT DOCUMENTS 2,465,820 A * 3/1949 Sharrow ................ H02K 3/487
24/16 R
2,747,118 A * 5/1956 Coggeshall .............. H02K 3/50
310/260
(Continued)

FOREIGN PATENT DOCUMENTS

CH 341908 A 10/1959
CN 1690426 A 11/2005
(Continued)

OTHER PUBLICATIONS

Extended European Search Report corresponding to EP Application No. 17153201.3, dated Jun. 14, 2017, 9 pages.
(Continued)

*Primary Examiner* — Tran N Nguyen
(74) *Attorney, Agent, or Firm* — Armstrong Teasdale LLP

(57) ABSTRACT

A motor for use in a refrigerant atmosphere includes a rotor configured to rotate about an axis and a stator adjacent the rotor. The stator includes a core defining an end, and a plurality of teeth defining a plurality of slots. A plurality of coils are wrapped around the plurality of teeth such that each coil of the plurality of coils comprises a pair of slot portions extending at least partially through adjacent slots of the plurality of slots and an end turn extending between the slot portions and at least partially across the end. A shell encapsulates the end of the stator such that the end turns of said plurality of coils are substantially sealed from the refrigerant atmosphere.

20 Claims, 5 Drawing Sheets

Related U.S. Application Data

(60) Provisional application No. 61/757,380, filed on Jan. 28, 2013.

(51) Int. Cl.
   *H02K 3/28* (2006.01)
   *H02K 3/487* (2006.01)
   *H02K 3/44* (2006.01)
   *H02K 3/50* (2006.01)
   *H02K 3/30* (2006.01)

(52) U.S. Cl.
   CPC ............... *H02K 3/487* (2013.01); *H02K 3/50* (2013.01); *H02K 15/02* (2013.01); *H02K 15/026* (2013.01)

(58) Field of Classification Search
   CPC .......... H02K 5/128; H02K 5/24; H02K 15/00; H02K 15/02; F04C 23/00; F04C 23/008; F25B 31/02; F25B 31/026; H01B 3/00; H01B 3/001
   See application file for complete search history.

(56) References Cited

U.S. PATENT DOCUMENTS

| | | | |
|---|---|---|---|
| 3,256,590 A * | 6/1966 | Myers | H02K 3/44 264/272.2 |
| 3,601,646 A * | 8/1971 | Balke | H02K 3/51 310/270 |
| 3,638,055 A * | 1/1972 | Zimmermann | H02K 5/128 264/272.19 |
| 3,688,137 A | 8/1972 | Filhol | |
| 3,710,437 A * | 1/1973 | Kipple | H02K 15/12 29/596 |
| 3,748,510 A * | 7/1973 | McNeal | H02K 3/38 310/68 C |
| RE28,705 E * | 2/1976 | Hoffmeyer | H02K 1/165 310/180 |
| 4,128,527 A * | 12/1978 | Kinjo | H02K 3/30 310/43 |
| 4,250,419 A * | 2/1981 | Zolman | H02K 11/25 174/138 F |
| 4,291,455 A | 9/1981 | Schnyder | |
| 4,352,897 A | 10/1982 | Ogata et al. | |
| 4,384,226 A * | 5/1983 | Sato | H02K 5/15 310/216.115 |
| 4,387,311 A * | 6/1983 | Kobayashi | H02K 5/08 310/43 |
| 5,015,159 A * | 5/1991 | Mine | F02M 37/08 123/41.31 |
| 5,671,607 A | 9/1997 | Clemens et al. | |
| 6,349,558 B1 | 2/2002 | Ichikawa et al. | |
| 6,359,354 B1 * | 3/2002 | Watanabe | H02K 5/08 310/154.45 |
| 6,509,665 B1 * | 1/2003 | Nishiyama | H02K 3/345 310/194 |
| 6,634,182 B2 | 10/2003 | Ichikawa et al. | |
| 7,042,129 B2 | 5/2006 | Neet | |
| 7,786,635 B2 * | 8/2010 | Gasser | H02K 5/10 310/43 |
| 2005/0073204 A1 * | 4/2005 | Puterbaugh | H02K 5/10 310/89 |
| 2007/0085426 A1 * | 4/2007 | Lee | H02K 1/04 310/43 |
| 2007/0114878 A1 * | 5/2007 | Tatebe | H02K 1/148 310/400 |
| 2009/0021101 A1 * | 1/2009 | Okamoto | H02K 1/12 310/216.004 |
| 2009/0191074 A1 * | 7/2009 | Suzuki | F04D 13/06 417/423.7 |
| 2011/0074230 A1 * | 3/2011 | Hasegawa | F04D 29/023 310/43 |
| 2012/0025646 A1 * | 2/2012 | Sheeran | H02K 3/30 310/88 |
| 2013/0264896 A1 | 10/2013 | Morita et al. | |
| 2014/0210302 A1 * | 7/2014 | Vodak | H02K 3/44 310/214 |

FOREIGN PATENT DOCUMENTS

| | | | |
|---|---|---|---|
| CN | 105207419 A | | 12/2015 |
| DE | 19902837 C1 | | 8/2000 |
| EP | 0729214 | | 8/1996 |
| EP | 1291528 A2 | | 3/2003 |
| FR | 2903246 | | 1/2008 |
| JP | 05256267 A | * | 10/1993 |
| JP | 10112949 | | 4/1998 |
| JP | 10141226 | | 5/1998 |
| JP | H11128899 A | | 5/1999 |
| JP | 2000083339 | | 3/2000 |
| JP | 2001115957 | | 4/2001 |
| JP | 2003134712 | | 5/2003 |
| JP | 2004056990 | | 2/2004 |
| JP | 2005171943 | | 6/2005 |
| JP | 2014240659 | * | 12/2014 ............ H02K 15/02 |

OTHER PUBLICATIONS

Communication pursuant to Article 94(3) EPC—Examination Report of EP 17 153 201.33-1201 dated Aug. 28, 2018; 8 pages.

* cited by examiner

MOTOR FOR USE IN REFRIGERANT ENVIRONMENT

RELATED APPLICATION DATA

This application is a continuation in part of U.S. Nonprovisional application Ser. No. 14/166,424 filed Jan. 28, 2014, which claims priority to U.S. Provisional Application No. 61/757,380 filed Jan. 28, 2013, the entire contents of which are incorporated herein by reference. This application claims the benefit of Chinese Patent Application No. 201610055583.7 filed Jan. 27, 2016, the entire contents of which are incorporated herein by reference.

BACKGROUND

The present invention relates to electric motors for use in an ammonia environment. More specifically, the present invention relates to motors for use in an ammonia environment and driven by a variable frequency drive.

SUMMARY

In one aspect, a motor for use in a refrigerant atmosphere includes a rotor configured to rotate about an axis and a stator adjacent the rotor. The stator includes a core defining an end, and a plurality of teeth defining a plurality of slots. A plurality of coils are wrapped around the plurality of teeth such that each coil of the plurality of coils comprises a pair of slot portions extending at least partially through adjacent slots of the plurality of slots and an end turn extending between the slot portions and at least partially across the end. A shell encapsulates the end of the stator such that the end turns of said plurality of coils are substantially sealed from the refrigerant atmosphere.

In another aspect, a method of assembling a motor for use in a refrigerant atmosphere includes forming a stator including a core and a plurality of teeth defining a plurality of slots. The core defines an end of the stator. A plurality of coils are wrapped around the plurality of teeth such that end turns of the plurality of coils extend across the end. A shell is formed over the end such that the end turns of the plurality of coils are substantially sealed from the refrigerant atmosphere.

In yet another aspect, a refrigeration system includes a compressor chamber configured to contain refrigerant and a compressor disposed in the compressor chamber and configured to draw in refrigerant at a pressure from the compression chamber and discharge the refrigerant at a higher pressure. A motor is disposed within the compressor chamber and coupled to the compressor to drive the compressor. The motor includes a rotor configured to rotate about an axis and a stator adjacent the rotor. The stator includes an end and a plurality of teeth defining a plurality of slots. A plurality of coils are wrapped around the plurality of teeth such that each coil of the plurality of coils comprises a pair of slot portions extending at least partially through adjacent slots of the plurality of slots and an end turn extending between the slot portions at least partially across the end. A shell encapsulates the end of the stator such that the end turns of the plurality of coils are substantially sealed from the refrigerant.

Other aspects of the invention will become apparent by consideration of the detailed description and accompanying drawings.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

DETAILED DESCRIPTION

Figure 1:
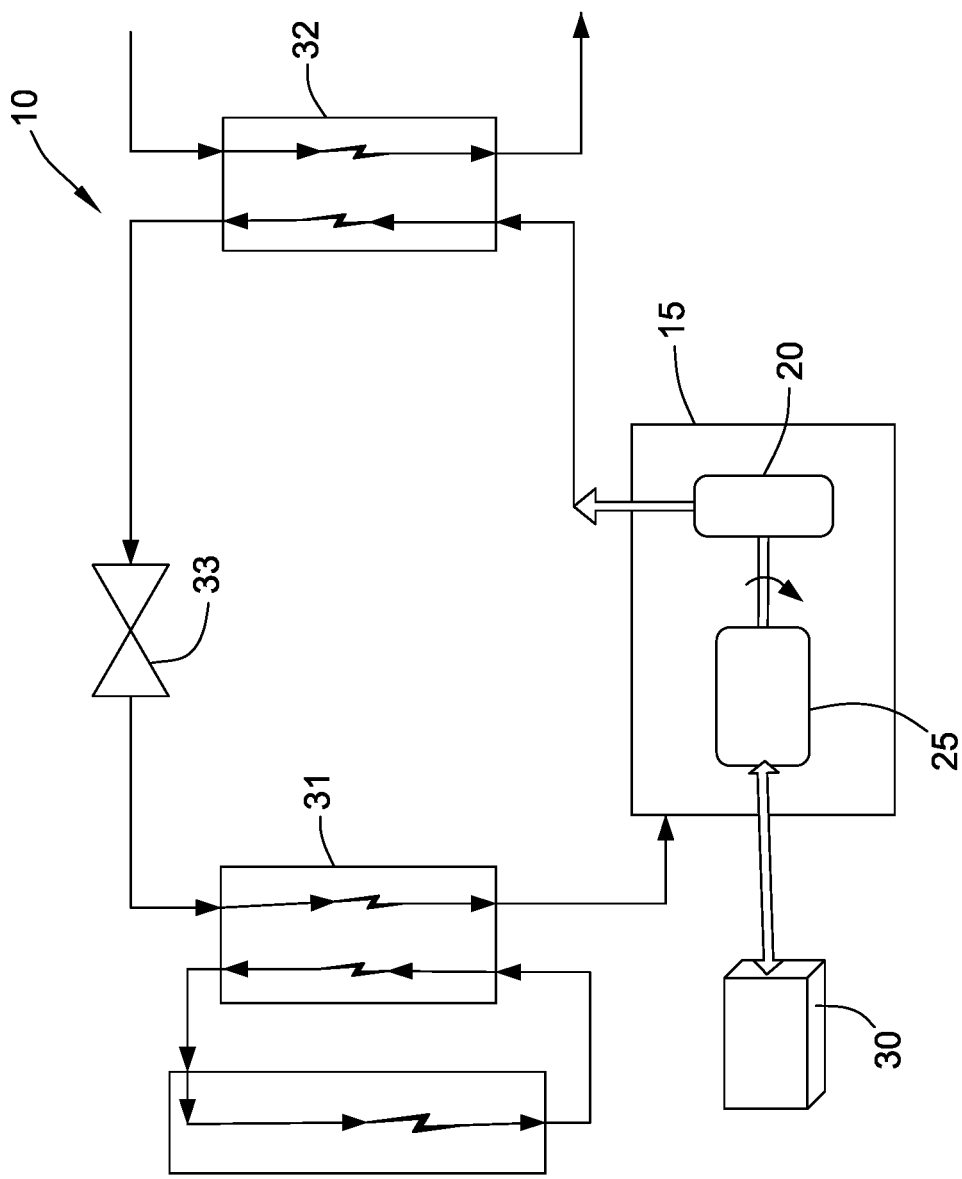
FIG. 1 is a schematic illustration of a refrigeration system including a compressor and a motor.

FIG. 1 illustrates a refrigeration system 10 that includes a compressor chamber 15 that contains a compressor 20 driven by an electric motor 25. The refrigeration system 10 also includes an evaporator 31, a condenser 32, and an expansion valve 33. The refrigeration system 10 is adapted for use with a refrigeration fluid such as ammonia. In one embodiment, the ammonia is refrigerant grade R-717 ammonia.

The compressor 20 could include one of a variety of different types of compressors including rotary screw, reciprocating, scroll, centrifugal, and the like. The actual style of compressor employed is not critical to the invention. Rather, all that is required is that the compressor 20 includes a stationary portion and a rotary portion coupled to a compressor shaft.

In preferred constructions, the motor 25 is a hermetic motor specifically designed to be submerged within a refrigerant atmosphere. The motor 25 can utilize an external power supply that can be line-fed or inverter-fed.

Motors 25 for ammonia compressors 20 are typically located outside the compressor chamber 15 and use either a shaft seal or a magnetic coupling to connect the motor 25 to the compressor shaft. This has been necessary because of the chemical aggressiveness of refrigerant (e.g., ammonia) towards standard materials of motor construction. Additionally, exposure to high temperature/pressure ammonia causes typical insulation materials to lose their resistance, which in turn causes premature motor failure. The present invention constructs the motor 25 out of materials that are more resistant to ammonia and uses techniques and arrangements that enhance the effectiveness of the materials, thereby allowing the motor 25 to be placed in the ammonia environment while operating satisfactorily for a sufficient length of time.

As illustrated in FIG. 1, the motor 25 and the compressor 20 are positioned inside the compressor chamber 15 to save space and provide the motor 25 the benefit of cooling from the refrigerant. This cooling of the motor 25 potentially allows for the use of smaller motors to achieve the same performance. Additionally, placing the motor 25 inside the compressor chamber 15 eliminates any potential leakage paths through external shaft seals. Finally, placing the motor 25 inside the compressor chamber 15 allows for a lower cost unit due to the elimination of duplicate brackets and bearings required to connect the motor externally. The compressor shaft can also be made shorter, shaft seals are eliminated, and magnetic couplings are not needed.

In preferred constructions, the motor 25 employs a Variable Frequency Drive (VFD) 30 to improve the efficiency of the refrigeration system 10 when compared to more conventional line-fed systems. The VFD 30 utilizes a control system that is sensitive to motor current draw and system leakage current.

The motor construction must be modified to assure that there are little or no areas in which the ammonia can make contact with electrically conductive areas within the motor windings or inter-pole connections. Because ammonia has a higher conductivity to electrical current then typical refrigerants used in hermetic compressors and because the motor stator resides in the ammonia, leakage current that might occur will likely be larger than on a motor not disposed in ammonia. Such current leakages would be more likely to cause the VFD motor protection to remove power to the motor 25. To reduce this likelihood, the motor 25 incorporates a stator winding in which no internal connections are present (i.e., each phase winding is continuous). The elimination of internal connections reduces the likelihood of any potential for leakage current to exist due to the ammonia refrigerant.

The motor 25 includes a stator 35 and a rotor 40 disposed adjacent the stator 35 and drivingly connected to the driven shaft of the compressor 20. In the illustrated construction, the rotor 40 includes a portion disposed within a cavity 45 of the stator 35. However, other motor arrangements could also be employed to drive the compressor 20.

The electric motor 25 is positioned within the refrigeration system 10 such that it is directly coupled to the compressor 20 and such that it is directly exposed to the refrigerant, in the illustrated example ammonia. Positioning the motor 25 in this way provides for more efficient transfer of power between the motor 25 and the compressor 20 and also provides more effective cooling of the motor 25 using the refrigerant as a coolant. However, refrigerant can be detrimental to many typical motor components.

Figure 2:
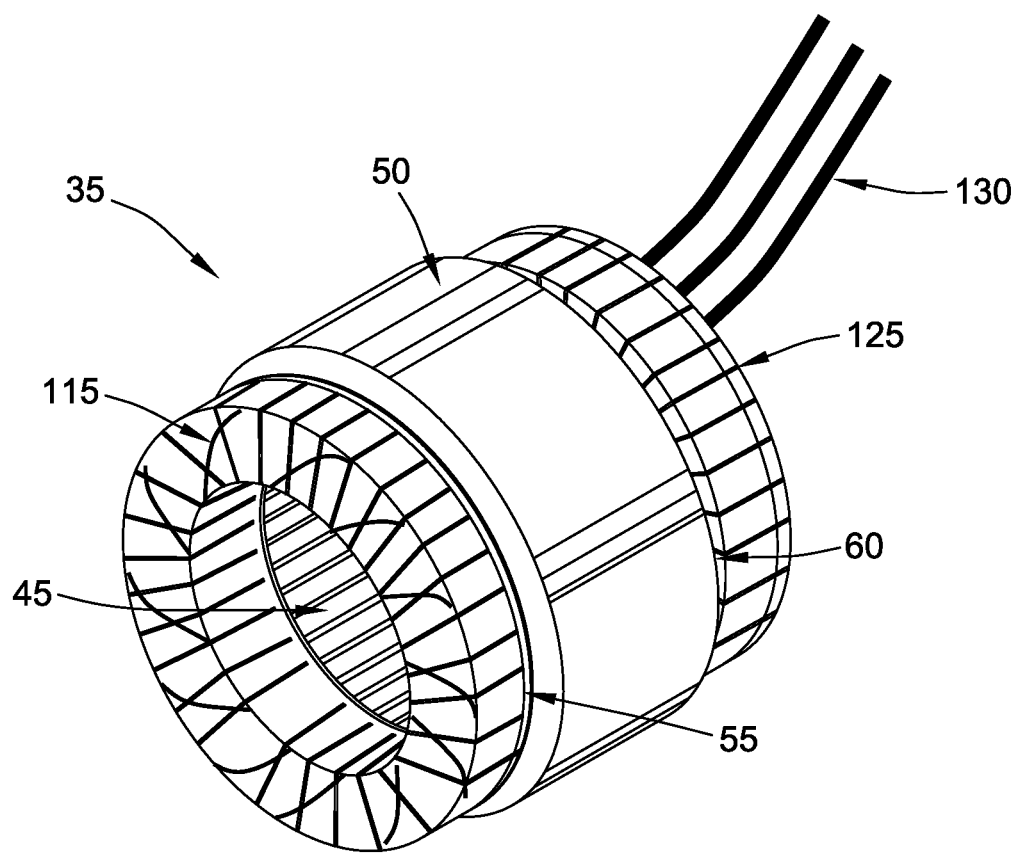
FIG. 2 is a perspective view of a stator.
Figure 3:
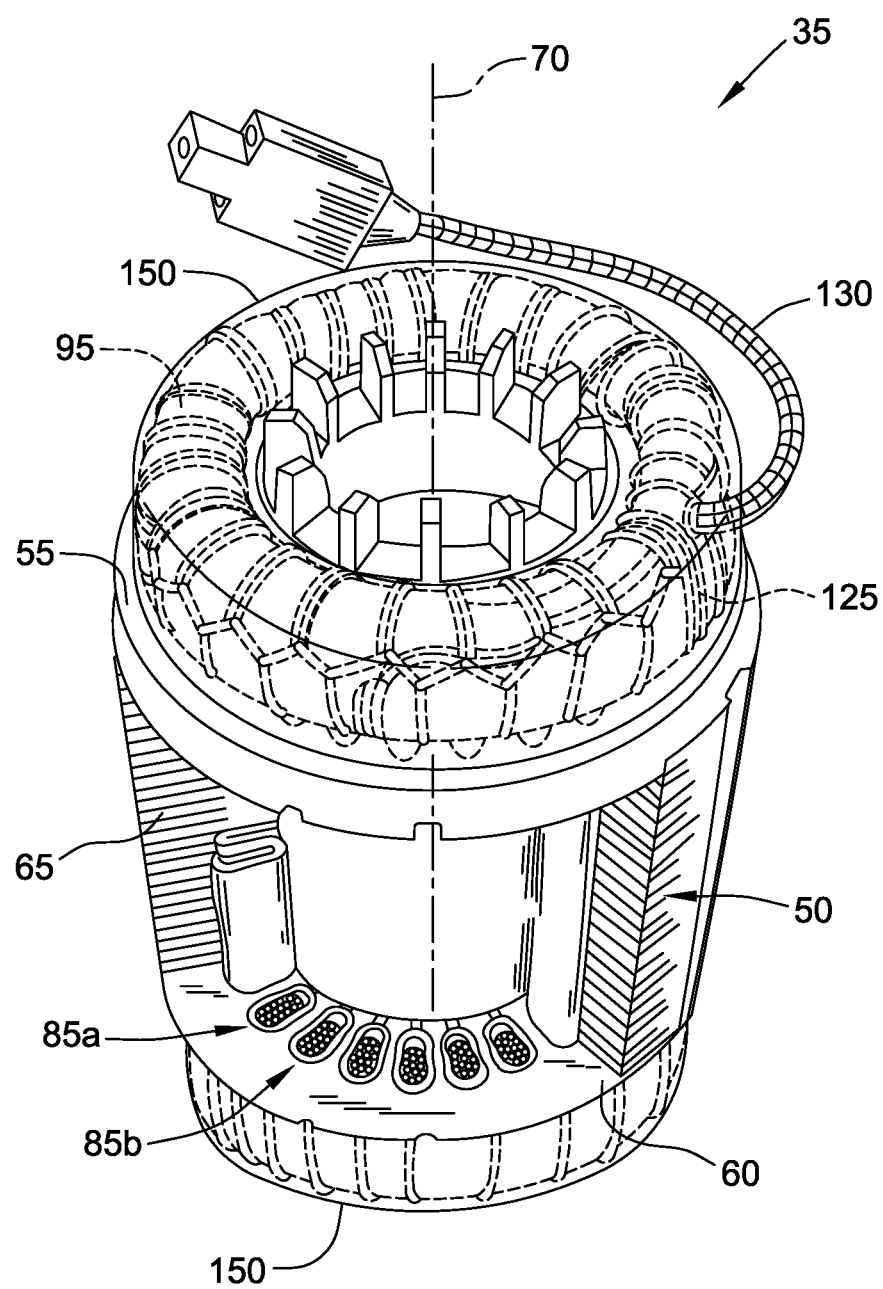
FIG. 3 is a more detailed perspective view of the stator of FIG. 2.
Figure 4:
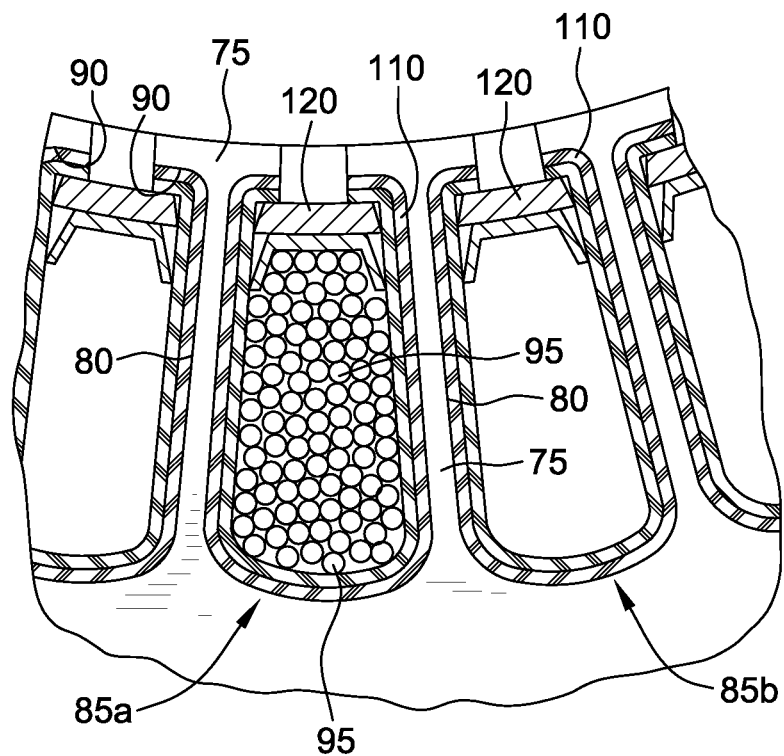
FIG. 4 is an end view of one of the slots illustrating the wire windings.

With reference to FIGS. 2-4, the stator 35 defines a cavity 45 that receives a portion of the rotor 40. The stator 35 includes a core 50 defining opposite end portions 55, 60. The stator core 50 includes a plurality of circumferentially spaced stacked metal laminations 65 disposed parallel to a centerline 70 of the cavity 45. In one embodiment, the metal laminations 65 consist of electrical grade lamination steel with other materials or constructions such as powdered metal portions being possible. As is best illustrated in FIG. 4, the stator core 50 includes a plurality of teeth 75 that each defines a pair of circumferentially spaced longitudinal slot walls 80. The slot walls 80 of adjacent teeth 75 cooperate with one another to define longitudinal slots 85 in the periphery of the stator 35. Each tooth also defines two hooks 90.

Circumferentially spaced coils are arranged with each coil disposed on one of the teeth 75 such that each coil is disposed at least partially in two slots 85. Each coil consists of a plurality of windings of wire 95 with portions of the windings of wire 95 extending longitudinally in the slots 85 in which the coil resides. Thus, each coil is defined by a plurality of windings of the wire 95 repeatedly passing through a first slot 85a, around the first end portion 55, passing through a second slot 85b adjacent the first slot 85a, around the second end portion 60, and again through the first slot 85a.

Figure 5:
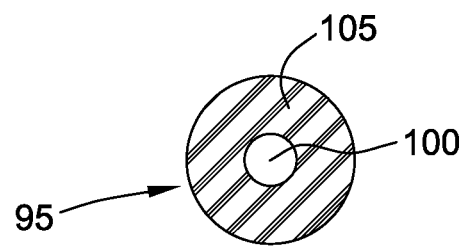
FIG. 5 is a cross-section of one of the winding wires.

As best shown in FIG. 5, the wire 95 consists of conductive material 100 immediately surrounded by wire insulation 105. In the illustrated construction, copper or aluminum wire 100 is used as the conductor 100 with aluminum being favored in an ammonia environment. In preferred constructions, polyetheretherketone (PEEK) material is used to form the insulation 105. While some constructions may use conductors 100 coated with PEEK insulation 105, a preferred construction employs extruded PEEK insulation 105 as testing has shown significant performance increases using this construction. Specifically, the extruded PEEK insulation 105 exhibits improved toughness and superior dielectric properties when compared to coated insulation.

Slot liners 110 are provided in the slots 85 between the windings of wire 95 and the respective slot walls 80 to further insulate the windings 95 from the magnetic core 50. In preferred constructions, the slot liners 110 are formed from sheets of polyphenylene sulfide (PPS). While various thicknesses of slot liners 110 are possible, one preferred construction employs slot liners 110 that are between about 0.01 and about 0.02 inches in thickness. The sheet material provides better formability and more robust properties than other materials that were tested.

In high voltage, multi-phase applications, the stator 35 may include interphase insulators 115, sometimes referred to as phase paper, between the coils to further insulate the different phases of the motor 25. In preferred constructions, phase paper 15 is employed and is made using sheets of a polyphenylene sulfide (PPS) material similar to that of the slot liners 110. As with the slot liners 110, the sheets provided improved characteristics when compared to other material choices.

When winding the stator 35, there is typically space within the slots 85 that is not filled. Wedges 120 are typically positioned within the slots 85 to take up this space, assure that the individual windings of wire 95 are packed as tightly as possible, and to limit unwanted movement of the wires 95. Although several different wedges 120 can be used to fill the desired space, in the illustrated construction longitudinally extending wedges 120 are employed. Each wedge 120 is positioned between a respective slot liner 110 and the stack of windings 95 within the slot 85. The wedge 120 engages the underside of two adjacent hooks 90 formed as part of the adjacent teeth 75 to apply a compressive force to the wires 95. In some constructions, pegs are positioned between the wires 95 and the wedge 120 to take up additional space and to provide a flatter engagement surface for the wedges 120. While many materials are available for wedges 120 and pegs, preferred constructions employ wedges 120, and pegs if used, that are formed from one of an epoxide laminate, a polyphenylene sulfide (PPS), and a polyetheretherketone (PEEK) material. The wedges 120 and pegs (if employed) are secured in interlocking relationship with the stator core 50 to prevent radially outward movement of the coils 95 relative to the stator core 50. It should be noted that any combination of the three identified materials could be employed for the construction of the stator 35. For example, pegs could be formed from a PEEK material with wedges 120 formed from PPS if desired. Alternatively, components could be manufactured as composites. For example, pegs or wedges 120 could be formed with a wood core that is coated or covered with extruded PEEK, PPS, or epoxide laminate material.

In some constructions, the stator 35 includes lacing cord 125 laced about the end turns of the coils. The lacing 125 tightly secures the end turns of the coils, thereby reducing unwanted movement or vibration. In preferred constructions, lacing tape 125 is formed from a NOMEX® tape. Of course, other constructions may use other materials (e.g., KEVLAR®, other meta-aramids, para-aramids, etc.) for lacing 125.

Figure 7:
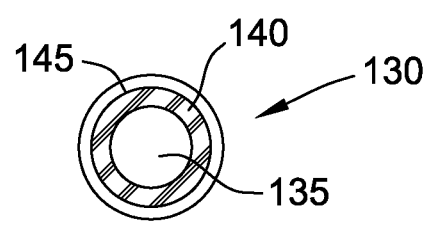
FIG. 7 is a cross-section of a lead wire.

The stator 35 also includes lead wire 130 that provides for a connection between the coils and the source of electrical power. As illustrated in FIG. 7, the lead wire 130 includes conductive material 125 (e.g., copper, aluminum, etc.) immediately surrounded by lead wire insulation 140. For example, one construction employs conductive material 135 consisting of wound strands of aluminum with lead wire insulation 140 formed from a fluoropolymer such as TEFLON® (i.e., polytetrafluoroethylene (PTFE)). In preferred constructions, the insulation 140 is formed over the motor leads to seal the leads and provide the desired insulation. In some constructions, the insulating material is provided in the form of a tape that is wrapped in overlapping relationship about the conductor 135 such that the proportion of tape overlap is at least about 50%. In one embodiment, the lead wire insulation 140 includes TEFLON® tape wrapped in overlapping relationship and strands or filaments of fiberglass overbraided over the TEFLON® tape. The fiberglass filaments provide a flexible abrasion-resistant covering over the TEFLON® tape. In an alternative embodiment (not shown), the motor can be leadless, such that the wire is directly connected to power terminals.

The stator 35 may also include sleeving 145 which protects the lead wire 130 and further insulates the lead wires 130 from each other at crossovers between the coils. In one embodiment, the sleeving 145 consists of a fluoropolymer such as TEFLON® (i.e., polytetrafluoroethylene (PTFE)).

In the exemplary embodiment, a shell 150 encapsulates at least a portion of the assembled stator 35. In particular, the shell 150 encapsulates the first end portion 55 and the second end portion 20 of the stator 35 such that the end turns of the coils are substantially sealed from the refrigerant atmosphere. In alternative embodiments, the shell encapsulates any portions of the stator 35 that enables the motor 25 to operate as described herein. In some embodiments, the shell 150 encapsulates substantially the entire stator 25. In the exemplary embodiment, the shell 150 is free of apertures to reduce the amount of current leakage. In some embodiments, the shell 150 is opaque. In alternative embodiments, the shell 150 has any characteristics that enable the motor 25 to operate as described herein.

Also, in the exemplary embodiment, the shell 150 includes an epoxy that bonds to the end turns of the coils. In one suitable embodiment, the shell 150 includes a low-viscosity epoxy such as an amine cured 100% solids epoxy topcoat available from ARCOR™ Epoxy Technologies, Inc. of South Dennis, Mass. under the trade name ARCOR™ EE11. In alternative embodiments, the shell 150 includes any materials that enable the motor 25 to operate as described herein.

Further, in the exemplary embodiment, the shell 150 has an average thickness in a range from about 1 millimeters (mm) to about 100 mm. In further embodiments, the shell 150 has an average thickness in a range from about 4 mm to about 10 mm. In alternative embodiments, the shell 150 has any thickness that enables the motor 25 to operate as described herein.

Moreover, in the exemplary embodiment, the shell 150 is formed by coating the end turns of the coils and all exposed surfaces of the stator 35 with a liquid that cures to form the shell 150. The stator 35 is coated by dipping the stator 35 at least partially in the liquid which adheres to the stator 35 and solidifies to form the shell 150. In further embodiments, the stator 35 is coated by trickle application of a liquid that solidifies to form the shell 150. In alternative embodiments, the shell 150 is formed in any manner that enables the motor 25 to operate as described herein. In the exemplary embodiment, the shell 150 seals the coils from the ammonia environment, bonds the wires 95 together to reduce movement of the wires 95 relative to one another, reduces noise from the motor 25, coats and bonds the laminations 65 in the stator 35, and anchors the interphase insulation. Moreover, the shell 150 facilitates protecting the end turns of the coils from nicks or abrasions as the stator 35 is placed in the compressor chamber 15 and during operation of the refrigeration system 10. As a result, the shell 150 increases the resistance of the motor 25 to the ammonia environment and reduces the risk of current leakage from the coils of the stator 35.

Figure 6:
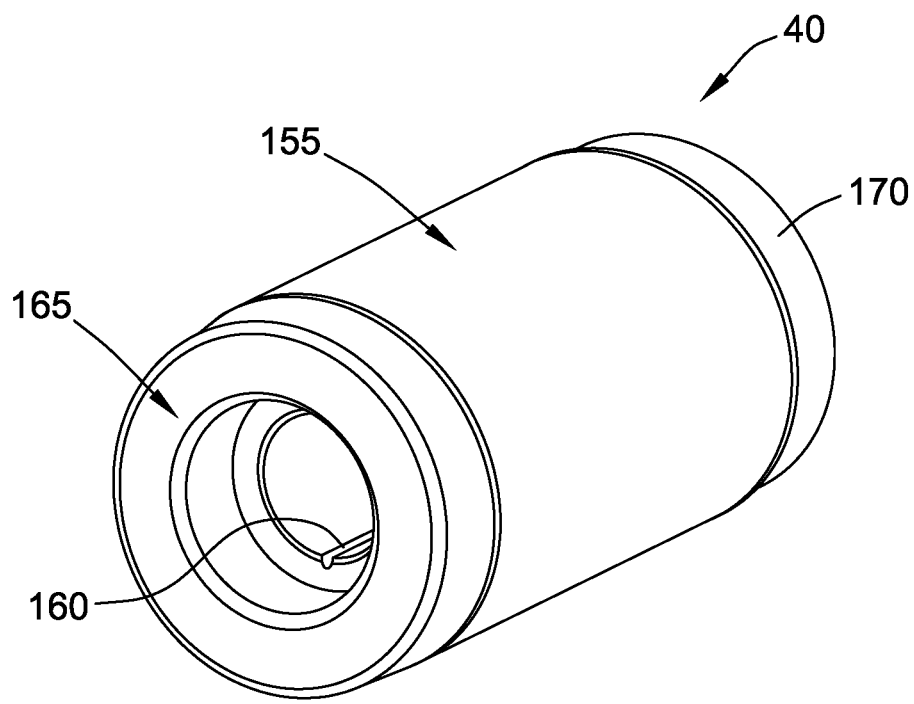
FIG. 6 is a perspective view of a rotor.

The rotor 40 is formed using conventional materials and techniques. The rotor 40, illustrated in FIG. 6 includes a rotor core 155 formed from laminations of electrical grade steel or aluminum stacked along the rotational axis 70 to a desired length. In other constructions, portions of the core 155 may be formed from powdered metal or other components. Rotor bars 160 extend the length of the core 155 and are coupled to end rings 165, 170 disposed at each end of the core 155. In preferred constructions, the bars 160 and end rings 165, 170 are formed using aluminum with other materials being possible.

The motor 25 formed of the indicated materials is more resistant to attack by ammonia than prior motors. The motor 25 can be mounted in the refrigeration system 10 in contact with ammonia, and the refrigeration system 10 is suitable for operation with the motor 25 in contact with ammonia. Therefore, the refrigeration system 10 can be simply and inexpensively constructed without sealing the motor 25 from the ammonia.

Various features and advantages of the invention are set forth in the following claims.

What is claimed is:

1. A motor for use in a refrigerant atmosphere, the motor comprising:
 a rotor configured to rotate about an axis;
 a stator including a surface defining a cavity configured to receive at least a portion of said rotor, said stator comprising:
  a core defining opposing ends;
  a plurality of teeth defining a plurality of slots;
  a plurality of slot liners positioned within the plurality of slots and formed of polyphenylene sulfide; and
  a plurality of coils wrapped around said plurality of teeth such that each coil of said plurality of coils comprises a pair of slot portions and end turns, said pair of slot portions extending at least partially through adjacent slots of the plurality of slots and at least partially through said plurality of slot liners, said end turns extending between said pair of slot portions and at least partially across said ends; and
 a shell encapsulating said stator such that said end turns of said plurality of coils and said surface are sealed from the refrigerant atmosphere, wherein said shell comprises an epoxy that adheres directly to said end turns of said plurality of coils and to said surface and bonds said end turns of said plurality of coils together, and wherein said shell entirely encapsulates said stator and defines the cavity in which said rotor is disposed, said rotor disposed in the cavity adjacent to said shell on said stator, wherein said shell is substantially free of apertures to reduce current leakage from said stator.

2. The motor in accordance with claim 1, wherein said shell has an average thickness in a range from about 4 millimeters (mm) to about 10 mm.

3. The motor in accordance with claim 1, wherein said shell is opaque.

4. A method of assembling a motor for use in a refrigerant atmosphere, the method comprising:
   forming a stator including a surface defining a cavity configured to receive at least a portion of a rotor including a core and a plurality of teeth defining a plurality of slots, the core defining opposing ends of the stator;
   positioning a plurality of slot liners in the plurality of slots, the plurality of slot liners formed of polyphenylene sulfide;
   wrapping a plurality of coils around the plurality of teeth such that end turns of the plurality of coils extend across the ends of the stator; and
   forming a shell of the stator such that the end turns of the plurality of coils and the surface are sealed from the refrigerant atmosphere, wherein the shell comprises a liquid epoxy that is directly adhered to the end turns of the plurality of coils, and wherein the shell entirely encapsulates said stator and defines the cavity in which said rotor is disposed, said rotor disposed in the cavity adjacent to said shell on said stator, wherein forming the shell comprises:
      adhering the liquid epoxy to the end turns of the plurality of coils and to the surface; and
      curing the liquid epoxy such that the cured epoxy bonds the end turns of the plurality of coils together, wherein the shell is substantially free of apertures to reduce current leakage from the stator.

5. The method in accordance with claim 4, wherein forming the shell comprises coating the end of the stator and exposed surfaces of the stator in the liquid epoxy.

6. The method in accordance with claim 4, wherein forming the stator comprises stacking a plurality of laminations to form a stack.

7. The method in accordance with claim 4, wherein forming the shell further comprises coating the end of the stator with the liquid epoxy and allowing the liquid epoxy to at least partially solidify.

8. The method in accordance with claim 7, wherein coating the end of the stator comprises positioning the end of the stator in a pool of the liquid epoxy.

9. A refrigeration system comprising:
   a compressor chamber configured to contain refrigerant;
   a compressor disposed in said compressor chamber and configured to draw in refrigerant at a pressure from said compression chamber and discharge the refrigerant at a higher pressure;
   a motor disposed within said compressor chamber and coupled to said compressor to drive said compressor, said motor comprising:
      a rotor configured to rotate about an axis;
      a stator including a surface defining a cavity configured to receive at least a portion of said rotor, said stator comprising:
         opposing ends;
         a plurality of teeth defining a plurality of slots;
         a plurality of slot liners positioned within the plurality of slots and formed of polyphenylene sulfide; and
         a plurality of coils wrapped around said plurality of teeth such that each coil of said plurality of coils comprises a pair of slot portions and end turns, said pair of slot portions extending at least partially through adjacent slots of the plurality of slots and at least partially through said plurality of slot liners, said end turns extending between said pair of slot portions at least partially across said ends; and
      a shell encapsulating said stator such that said end turns of said plurality of coils and said surface are sealed from the refrigerant atmosphere, wherein said shell comprises an epoxy that adheres directly to said end turns of said plurality of coils and to said surface and bonds said end turns of said plurality of coils together, and wherein said shell entirely encapsulates said stator and defines the cavity in which said rotor is disposed, said rotor disposed in the cavity adjacent to said shell on said stator, wherein said shell is substantially free of apertures to reduce current leakage from said stator.

10. The refrigeration system in accordance with claim 9, wherein the refrigerant includes at least one of ammonia and dichloromethane.

11. The motor in accordance with claim 1, wherein the stator further comprises a lead wire connecting the plurality of coils and a source of electrical power and a fluoropolymer sleeve surrounding across the lead wire.

12. The motor in accordance with claim 1, wherein the stator further comprises lacing cord laced about the end turns of the coils.

13. The motor in accordance with claim 1, wherein said stator further comprises a plurality of interphase insulators positioned between said plurality of coils.

14. The motor in accordance with claim 13, wherein said plurality of interphase insulators are formed of polyphenylene sulfide.

15. The motor in accordance with claim 1, wherein said stator further comprises a plurality of wedges positioned within the plurality of slots.

16. The motor in accordance with claim 15, wherein said plurality of wedges are formed of polyphenylene sulfide.

17. The motor in accordance with claim 1, wherein said stator further comprises a plurality of pegs positioned within the plurality of slots.

18. The motor in accordance with claim 17, wherein said plurality of pegs are formed of polyphenylene sulfide.

19. The motor in accordance with claim 1, wherein said stator further comprises a plurality of wedges and a plurality of pegs positioned within the plurality of slots.

20. The motor in accordance with claim 19, wherein said plurality of wedges and said plurality of pegs are formed of polyphenylene sulfide.

* * * * *